United States Patent

Lips

[11] Patent Number: 5,929,830
[45] Date of Patent: Jul. 27, 1999

[54] ELECTRONIC DISPLAY DEVICE WITH COLOR FILTER

[75] Inventor: Wilbert E. M. Lips, Eindhoven, Netherlands

[73] Assignee: Flat Panel Display Co. (FPD) B.V., Eindhoven, Netherlands

[21] Appl. No.: 08/784,675

[22] Filed: Jan. 21, 1997

[30] Foreign Application Priority Data

Jan. 18, 1996 [EP] European Pat. Off. .............. 96200121

[51] Int. Cl.⁶ .......................... G09G 3/36; G02F 1/1333
[52] U.S. Cl. ......................... 345/88; 349/106; 349/111; 349/138
[58] Field of Search ................... 345/30, 88, 87; 359/74, 68, 75, 59; 349/122, 106, 153, 138, 110, 111

[56] References Cited

U.S. PATENT DOCUMENTS

| | | |
|---|---|---|
| 4,853,296 | 8/1989 | Fukuyoshi . |
| 5,045,418 | 9/1991 | Fukuyoshi . |
| 5,079,214 | 1/1992 | Long et al. . |
| 5,128,785 | 7/1992 | Yoshimoto et al. ...................... 359/58 |
| 5,157,527 | 10/1992 | De Keyzer et al. ...................... 359/66 |
| 5,231,524 | 7/1993 | De Keyzer et al. . |
| 5,381,255 | 1/1995 | Ohnuma et al. .......................... 359/68 |
| 5,437,896 | 8/1995 | Kloosterboer et al. ................... 359/68 |
| 5,438,421 | 8/1995 | Sugawara et al. ........................ 359/75 |
| 5,535,030 | 7/1996 | Ogura et al. ............................. 359/74 |
| 5,671,030 | 9/1997 | Ohnuma et al. ........................ 349/106 |

*Primary Examiner*—Jeffery Brier
*Assistant Examiner*—David L. Lewis
*Attorney, Agent, or Firm*—John C. Fox

[57] ABSTRACT

The effective image surface area can be increased by insulating, for example by means of an additional layer of an insulating material, electrodes and conductive parts of a black matrix relative to each other at the location of the edge of a patterned top coat of a display device.

3 Claims, 1 Drawing Sheet

ELECTRONIC DISPLAY DEVICE WITH COLOR FILTER

BACKGROUND OF THE INVENTION

The invention relates to a display device comprising an electro-optical material between a first substrate and a second, substantially parallel substrate, in a space bounded by a sealing edge, said first substrate being provided with electrodes and a color filter which is covered with a protective layer only within the space bounded by the sealing edge.

Such display devices are well known and are used, for example, in monitors, television receivers and display devices for motor cars, telephone equipment and instruments.

A display device of the type mentioned in the opening paragraph is described in U.S. Pat. No. 5,157,527 (PHN 13.252). In said display device a description is given of the manner in which a color filter on a first substrate is covered with a protective layer, the so-called top coat, which is situated within the space bounded by the sealing edge. Such a patterned top coat is provided, for example, by flexographic printing and has a number of advantages over a top coat applied by 'spinning'. In the latter method (spinning), the top coat extends underneath the sealing edge, so that this sealing edge is not bonded directly on to the substrate (or on to an electrode provided thereon), but on to the top coat (or on to an electrode provided thereon), which in turn is bonded on to the substrate. This double bond adversely affects the reliability of the seal. The same drawbacks arise when drive circuits (ICs) supplying drive voltages, as in the case of so called passive matrices in particular, are connected to said electrodes, or when two-pole switching elements are used for driving.

In addition, the material used for the top coat is often permeable to moisture, so that moisture coming from outside penetrates the display device.

Finally, the printing method is cheaper than spinning because, among other things, the material is less expensive.

A drawback of the printing method occurs when, in order to increase the contrast, the color filter is provided with a layer of an opaque material (black matrix), which is composed entirely or partly of a conductive material. To preclude that electrodes extending beyond the edge of the top coat electrically contact the black matrix (and consequently are mutually short-circuited), said top coat must extend beyond the color filter, including the black matrix (while allowing a given tolerance). As a result, a part of the useful surface is lost at the edge of the effective display section, so that the effective display section is reduced in size.

OBJECTS AND SUMMARY OF THE INVENTION

It is an object of the invention to provide, inter alia, a display device of the type mentioned in the opening paragraph, which has a larger effective display section at the same outside dimensions of the display device.

To this end, a display device in accordance with the invention is characterized in that the color filter is provided, at least at an edge, with a conductive material-containing layer of an opaque material, which is electrically insulated, at least at the location of the edge of the protective layer, from an electrode present at said edge by an additional layer of electrically insulating material.

As the layer of an opaque material (black matrix) now is electrically insulated, at the location of the edge of the protective layer, from an electrode situated at said edge, a short-circuit between the electrode and the black matrix cannot occur. Consequently, the top coat does not have to extend throughout the black matrix and can end, for example, on a conductive part of said black matrix.

The above-mentioned insulation is obtained, for example, by means of an additional layer of an electrically insulating material, which extends under a part of the protective layer or under the entire protective layer.

These and other aspects of the invention will be apparent from and elucidated with reference to the embodiments described hereinafter.

BRIEF DESCRIPTION OF THE DRAWINGS

In the drawings:

FIG. 1 is a schematic, cross-sectional view of a part of a display device in accordance with the prior art, whereas

The Figures are schematic and not drawn to scale. Like parts generally bear like reference numerals.

DESCRIPTION OF THE PREFERRED EMBODIMENTS

Figure 1:
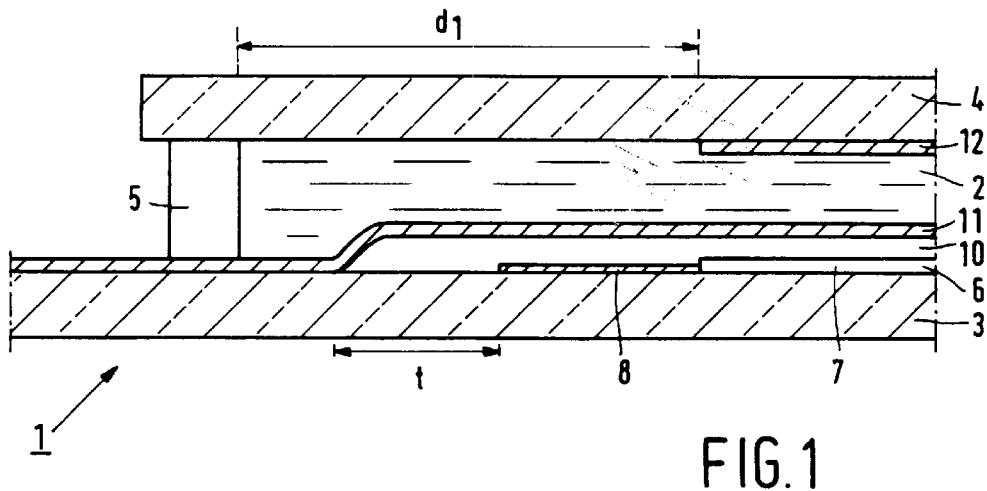

FIG. 1 is a schematic, cross-sectional view of a part of a liquid-crystal display device comprising a liquid-crystal cell 1 having a twisted nematic liquid-crystal material 2 sandwiched between two substrates 3,4, which are made, for example, of glass. The liquid-crystal material is enclosed in the cell by means of a sealing edge 5. A color filter 6 which is provided with color elements 7 and with a metallic black mask 8, which, in this example, is made of chromium, is situated on the first substrate 3. The color filter is covered with a top coat 10 which is situated within the space bounded by the sealing edge 5 and which carries electrodes 11. The electrodes 11 are, for example, strip-shaped and define, together with strip-shaped electrodes 12 situated on the other substrate, a matrix of pixels (passive matrix). It is alternatively possible that the strip-shaped electrodes 11 form column electrodes, while the electrodes 12 form separate picture electrodes which are connected, via two-pole switching elements (for example MIMs or diodes) to selection electrodes (not shown).

To preclude a short-circuit between the electrode 11, which extends beyond the edge of the top coat, and the portion 8 of the black matrix, said top coat must extend beyond the color filter, including the black matrix (while allowing a given tolerance t).

The minimum distance from the sealing edge 5 to the effective display section, which is determined by the electrode 12, is now defined by the distance $d_1$ ((distance sealing edge-top coat)+tolerance t+width of the edge of the black matrix 8).

In a device in accordance with the invention (FIG. 2), an additional insulating layer 9 extends over the color filter layer 6, so that the black matrix 8 is electrically insulated from the electrode 11, at the location of the edge of the top coat, and said short-circuit is precluded. The minimum distance from the sealing edge 5 to the effective display section, which is determined by the electrode 12, is now defined by the distance $d_2$ (the sum of the minimum distance between the sealing edge and the edge of the top coat and the minimum overlap of the top coat and the color filter). Consequently, the provision of the additional insulating layer 9, which may for example consist of silicon nitride, leads to a substantial saving of space at the location of the edge of the cell.

Figure 2:
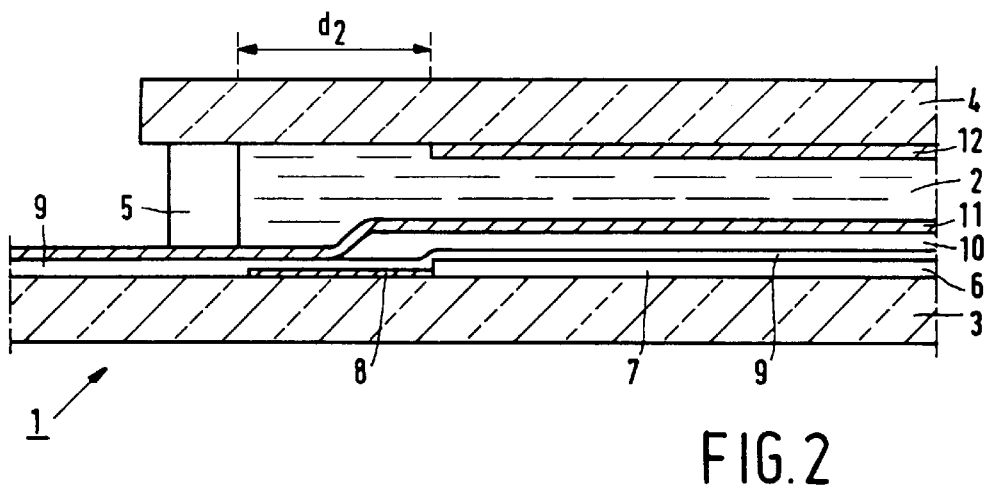
FIG. 2 and FIG. 3 are schematic, cross-sectional views of a part of a display device in accordance with the invention.
Figure 3:
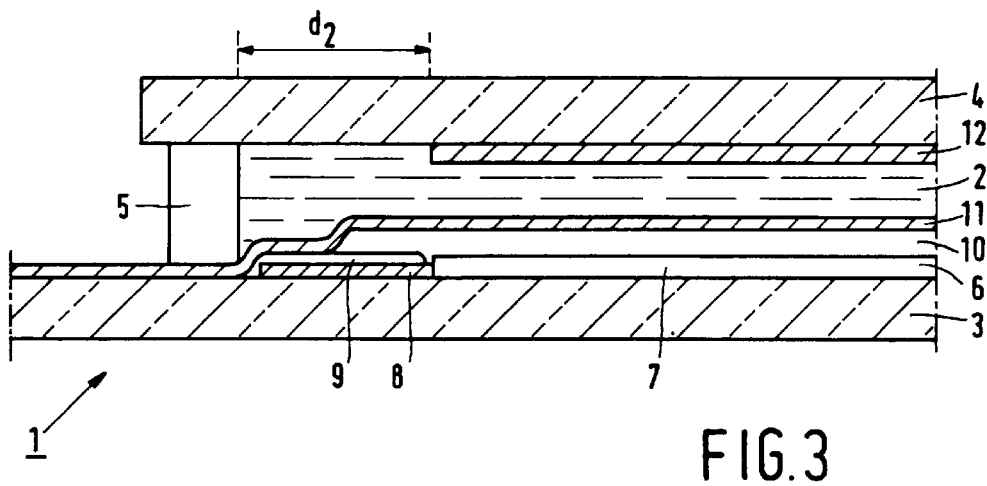

In the embodiment of FIG. 2, the additional insulating layer extends, on the one hand, underneath the entire top coat and, on the other hand, underneath the electrode 11 and beyond the sealing edge. However, this is not necessary, as is shown in FIG. 3 in which the additional insulating layer 9 extends only from the sealing edge underneath and beyond the edge of the top coat.

In summary, the invention relates to insulating, for example by means of an additional layer of an insulating material, of electrodes and conductive parts of a black matrix relative to each other at the location of the edge of a patterned top coat of a display device. The measure results in an increase of the effective image surface area.

I claim:

1. A display device comprising an electro optical material between a first substrate and a second, substantially parallel substrate in a space bounded by a sealing edge, said first substrate being provided with electrodes and a color filter which is covered with a protective layer only within the space bounded by the sealing edge, characterized in that the color filter is provided, at least at an edge, with a conductive material-containing layer of an opaque material, which is electrically insulated, at least at the location of the edge of the protective layer, from an electrode present at said edge, by an additional layer of electrically insulating material.

2. A display device as claimed in claim 1, characterized in that the additional layer of an electrically insulating material extends under a part of the protective layer.

3. A display device as claimed in claim 2, characterized in that the additional layer of an electrically insulating material extends under the entire protective layer.

* * * * *